March 15, 1927.
D. R. McGINNIS
ELECTRIC POULTRY PERCH
Filed Feb. 2, 1926
1,621,424
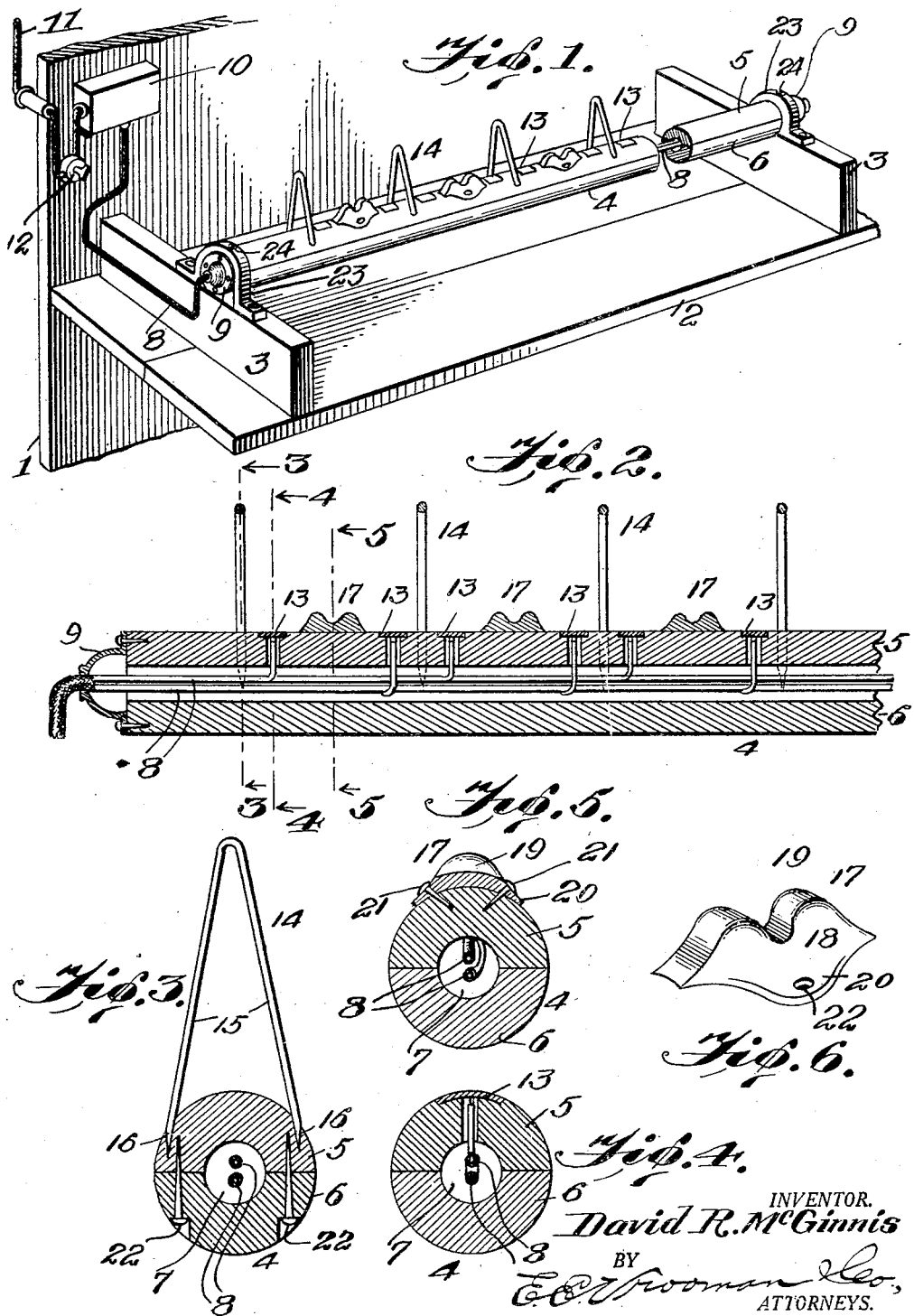
INVENTOR.
David R. McGinnis
BY
ATTORNEYS.

Patented Mar. 15, 1927.

1,621,424

UNITED STATES PATENT OFFICE.

DAVID R. McGINNIS, OF KALISPELL, MONTANA.

ELECTRIC POULTRY PERCH.

Application filed February 2, 1926. Serial No. 85,464.

This invention relates to an electric poultry perch.

It is a fact that with those keeping hens the greatest desire is to obtain from them a maximum number of eggs. In an effort to accomplish this result, many foods are resorted to, of a highly stimulating character. It is known that if a hen is kept warm and comfortable, especially during the roosting time, the hen is sure to lay more eggs. Therefore, without the use of any stimulating foods, I have provided new and novel electrical means for keeping the poultry warm and comfortable during roosting or perching time, whereby the egg laying capacity of a hen is greatly increased, at a minimum expense, and also with comparative ease.

The object of the invention is the construction of a simple and efficient electric poultry perch or roost.

Another object of the invention is the construction of an electric poultry perch which includes means for passing a current through a fowl; preventing the fowls from overcrowding and also providing a more efficient resting place on a perch than heretofore furnished.

With these and other objects in view, my invention consists of certain novel constructions, combinations, and arrangements of parts as will be hereinafter fully described, illustrated in the accompanying drawings, and more particularly pointed out in the appended claims.

In the drawings—

Figure 1 is a perspective view of an electric perch constructed in accordance with the present invention.

Figure 2 is a fragmentary, enlarged, longitudinal sectional view of an electric perch.

Figure 3 is a sectional view taken on line 3—3, Figure 2, and looking in the direction of the arrows.

Figure 4 is a sectional view taken on line 4—4, Figure 2 and looking in the direction of the arrows.

Figure 5 is a sectional view taken on line 5—5, Figure 2, and looking in the direction of the arrows.

Figure 6 is a perspective view of one of the breast saddles constituting a part of my electric poultry perch.

Referring to the drawings by numerals, 1 designates a portion of a building; 2 is the dropping board, and 3, 3 are ordinary uprights upon which is positioned my electric poultry perch 4.

The perch 4 is preferably formed in two sections, the upper section 5 and the lower section 6. These sections are centrally grooved to form a longitudinally extending channel 7. This channel 7 is preferably shown cylindrical in form, and is provided for holding the electrical insulated wires 8; these wires 8 extend through end sealing caps 9, secured on the ends of the body of the perch constituted by the sections 5 and 6, and the wires are electrically connected to the transformer 10, which transformer is suitably fastened on the building 1. A feed wire 11 is provided with a switch 12 and is connected to the transformer 10, whereby when the operator desires to place the perch 4 in operation, all he has to do is to turn or "throw" the switch 12 and the perch will be ready for use, as will be hereinafter explained. The caps 9 are provided for tightly sealing the ends of the perch, whereby no vermin is permitted in the channel 7.

The perch is constructed to accommodate a number of fowls or hens and this is accomplished by arranging electrodes 13 in pairs, so that when a hen is on the perch, her feet will be in direct contact with a pair of electrodes, thereby permitting a gentle warming electric current to pass through her body during the entire period of roosting on the perch. The electrodes 13 are connected to wires 8, one wire and electrode being positive and the other wire and electrode being negative. It is immaterial which electrode in each pair is the positive or negative one, just so long as in each pair for each fowl, there is a positive and a negative electrode with its proper electrical connection to a source of electrical energy.

The pair of electrodes for each hen is more positively disclosed by means of divisional devices 14, which divisional devices 14 primarily prevent overcrowding of the fowls or hens on the perch, during roosting time, but does not prevent the natural body warmth of the fowls from being felt by their neighbors. It is to be noted that each two contiguous divisional devices 14 have a set or pair of electrodes therebetween for use by one fowl or hen. These divisional devices 14 each comprise an inverted V-shaped body 15 with lower sharpened penetrating ends 16 (Fig. 3) that are easily driven into the upper section 5 of the body 4 of the perch. This divisional device 14 is preferably formed from suitable wire or strip of metallic material.

Between each two divisional devices, and the set of electrodes 13 therebetween, I place a breast saddle 17. This saddle 17 comprises a body 18 that is provided with a central notch or groove 19 in which rests the breast or breast bone of the fowl while roosting on the perch. The body 18 has a base 20, which is substantially concavo-convexed (Fig. 5) to allow the saddle to fit snugly upon the curved face of the body 4 of the perch. Suitable fastening means as tacks or nails 21 are driven through the apertures 22 (Figs. 5 and 6) into the body of the perch for holding the saddle thereon. The fowl or hen naturally settles down upon the perch, and by means of the divisional devices 14, the feet of the fowl will positively locate against (and in contact therewith) the electrodes 13 in each pair, whereupon a gentle, yet sufficient current of electricity will pass through the body of the fowl to keep it comfortably warm during the roosting period, whereby no highly stimulating food is necessary to heat the fowls during the night time when it is always the coldest. This allows the hen to be comfortable and, consequently, greatly increasing her egg laying powers without the necessity of over stimulating her by feeding highly stimulating foods or stimulants, such as red pepper and the like.

The operator controls the amount of electrical current passing through wires 8 through the transformer 10, so that whether there be one fowl or many fowls on the perch, each will receive a uniform amount of current.

The sections 5 and 6 are preferably held together by means of nails 22 (Fig. 3); these nails 22 constitute fastening means for securing the sections of the body of the perch together. The inverted substantial V-shaped divisional devices 14 constitute divisional means on the body of the perch for preventing overcrowding and also to assist in locating the fowls, each over a set or pair of electrodes, for the purpose hereinbefore described. The saddles 17 are resting or locating means between the electrodes of the sets or pairs, which saddles in themselves, constitute means for assisting in locating the fowls over the electrodes, all of which devices actually produce a highly efficient perch for subjecting a roosting fowl to a beneficial electric current.

When I use a pole-like perch, round in cross-section, as per the embodiment shown in the accompanying drawings, I find it necessary to place brackets 23 over the ends of the body 4 (Fig. 1) resting the ends of the brackets upon the tops of the uprights 3, and through the ends of the brackets, I place suitable fastening means for securing the ends of the brackets to the uprights 3. I also use a fastening means, at 24, which passes through the bracket and into the body 4 of the perch, holding the body from rotation upon the uprights 3, thereby keeping the perch in a practical operative position to be used by the fowls for roosting.

The uprights 3 constitute supporting means for the perch.

While I have described the preferred embodiment of my invention and illustrated the same in the accompanying drawings, certain minor changes or alterations may appear to one skilled in the art to which this invention relates, during the extensive manufacture of the same, and I, therefore, reserve the right to make such alterations or changes as shall fairly fall within the scope of the appended claims.

What I claim is:

1. An electric poultry perch, comprising a body, and means carried by said body for passing a current of electricity through a fowl while resting or roosting upon the body.

2. An electric poultry perch, comprising a body provided with means for subjecting a fowl to a current of electricity while in contact therewith.

3. An electric poultry perch, comprising a body and said body provided with electrical means for individually subjecting fowls to separate currents of electricity while resting or roosting upon the perch.

4. In an electric poultry perch, the combination of a body, a positive and a negative electrode carried by said body, and wires leading from a source of electricity electrically connected to said electrodes.

5. In an electric poultry perch, the combination of a body, a set of electrodes carried by the outer face of said body, whereby the feet of a fowl may rest against the same, and wires carried by the body and connected to said set of electrodes whereby when a fowl is on the body, an electrical current will pass through it.

6. In an electric poultry perch, the combination of a substantially horizontal body, a plurality of sets of electrodes arranged in alignment upon said body, and electrical wires carried by said body and separately connected to the electrodes in each set.

7. In an electric poultry perch, the combination of a sectional body, electrical wires between the sections of said body, a set of electrodes on said body, and means electrically connecting said wires separately to said electrodes.

8. In an electric poultry perch, the combination of a body comprising an upper and a lower section, feed wires between said sections, sets of electrodes countersunk in the upper section, and means separately connecting the electrodes of each set to said feed wires.

9. In an electric poultry perch, the combination of a body provided with a channel, wires in said channel, caps around the wires and over the ends of the body closing said channels, and means on said body and electrically connected to said wires for subjecting a fowl to an electric current while standing or roosting upon the body.

10. In an electric poultry perch, the combination of a body, divisional means on said body, and means carried by the body between the divisional means for subjecting a fowl to an electric current while resting or roosting upon the body.

11. In an electric poultry perch, the combination of a body, a plurality of divisional devices on said body, electrodes on the body between said divisional devices, and means connected to said electrodes for supplying an electric current thereto when a fowl is in contact with the electrodes.

12. In an electric poultry perch, the combination with a body, of electrodes carried by said body, a fowl breast saddle on the body between said electrodes, divisional and locating means on the body contiguous to said electrodes, and means electrically connecting said electrodes to a source of electrical energy.

13. In an electric poultry perch, the combination with a body, of a pair of feet engaged electrodes carried by said body, positioning means on the body for causing a fowl to center its feet over said electrodes, and means connecting said electrodes to a source of electrical energy.

In testimony whereof I hereunto affix my signature.

DAVID R. McGINNIS.